Figure 10:
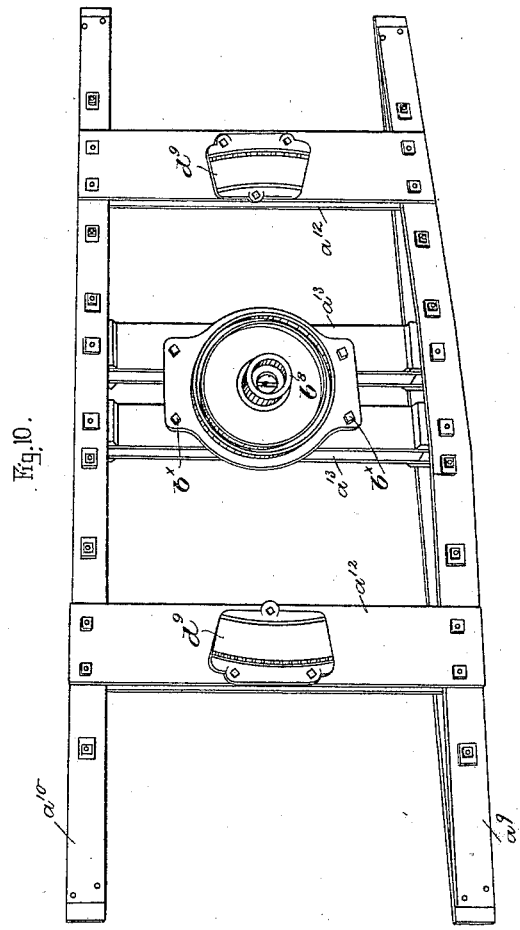

(No Model.) 2 Sheets—Sheet 1.
L. K. JEWETT.
ANTI-FRICTION BEARING.
No. 427,693. Patented May 13, 1890.
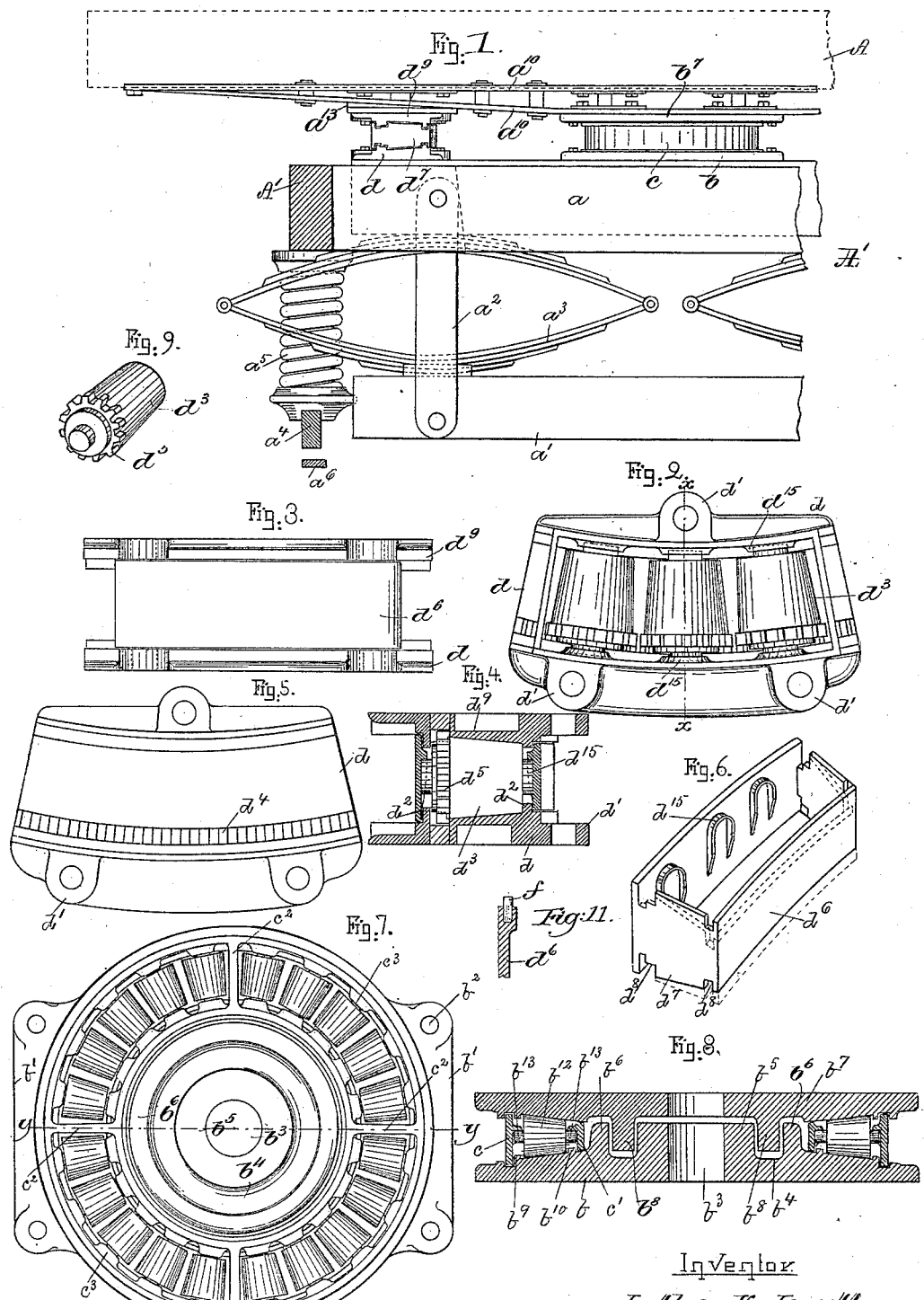
Inventor
Luther K. Jewett.
by Crosby & Gregory
Attys.
Witnesses.

(No Model.)
2 Sheets—Sheet 2.

L. K. JEWETT.
ANTI-FRICTION BEARING.

No. 427,693.   Patented May 13, 1890.

Witnesses.
Edgar A. Goddin.
Frederick L. Emery.

Inventor.
Luther K. Jewett,
by Crosby & Gregory
Attys.

UNITED STATES PATENT OFFICE.

LUTHER K. JEWETT, OF BOSTON, MASSACHUSETTS, ASSIGNOR TO THE JEWETT SUPPLY COMPANY, OF PORTLAND, MAINE.

ANTI-FRICTION BEARING.

SPECIFICATION forming part of Letters Patent No. 427,693, dated May 13, 1890.

Application filed January 11, 1890. Serial No. 336,636. (No model.)

*To all whom it may concern:*

Be it known that I, LUTHER K. JEWETT, of Boston, county of Suffolk, State of Massachusetts, have invented an Improvement in Anti-Friction Supports or Bearings, of which the following description, in connection with the accompanying drawings, is a specification, like letters on the drawings representing like parts.

This invention has for its object to provide a novel anti-friction bearing, support, or device especially adapted, among other things, to be used between car-bodies and their car-trucks.

In accordance with my invention the two bearing-surfaces are made plane and parallel or substantially parallel, and provided with guides, and balls or rollers provided with arbors are interposed between the said surfaces within the guides, so that the weight or pressure bears upon the body of the roller or ball and not upon the arbor of the said rollers or balls, the latter, when two or more are used, being separated and maintained out of contact with one another by means of a spacing-frame, which is free to move with the said rollers or balls.

My improved anti-friction device is especially adapted to be used both for a center bearing and as side bearings for the car-body; but it may be used in any place where it is desired to reduce friction.

The particular features of my invention will be pointed out in the claims at the ends of this specification.

Figure 1 is a transverse section of a sufficient portion of a car-body and its truck provided with anti-friction devices embodying my invention to enable the said invention to be understood; Fig. 2, a top or plan view of the form of anti-friction device preferred by me as a side bearing for a car-body, the top or upper plate being removed; Fig. 3, a side elevation of the anti-friction device shown in Fig. 2; Fig. 4, a transverse section of the device shown in Fig. 2 on line $x\,x$; Figs. 5 and 6, details to be referred to; Fig. 7, a top or plan view of the anti-friction device employed as the center bearing, the top-plate being removed; Fig. 8, a section of the center bearing, shown in Fig. 7 on line $y\,y$; Fig. 9, a detail of one of the rollers; Fig. 10, a detail of the car-body bolster-truss to be referred to, and Fig. 11 a modification to be referred to.

The car-body A, (represented by dotted lines, Fig. 1,) and the car-truck A', provided, as herein shown, with a truck-bolster $a$, swing-plank $a'$, suspended by links $a^2$, only one of which is shown, bolster-sustaining springs $a^3$, equalizer-bar $a^4$, equalizer-springs $a^5$, and pedestal tie-bar $a^6$, are and may be of any desired or well-known construction, such as now commonly used on railways. The car-body A has secured to its bottom, as herein shown, a car-body bolster, (shown separately in Fig. 10,) it consisting of metallic trusses $a^9\,a^{10}$, each made of a top and bottom piece, and cross-bars $a^{12}\,a^{13}$. The metallic trusses $a^9\,a^{10}$ are extended crosswise of the car and the cross-bars $a^{12}\,a^{13}$ extend in the direction of the length of the car.

The car-truck bolster has secured to it near its center one bearing-surface of my improved center anti-friction device, the said bearing-surface being shown as a substantially circular plate or casting $b$, (see Figs. 7 and 8,) having ears $b'$, provided, as shown, with bolt-holes $b^2$, through which are extended the bolts $b^\times$, (see Fig. 10,) by which the said plate or casting is secured to the car-truck bolster. The plate or casting $b$ is provided with a central hole $b^3$ for the passage of the usual king-bolt, (not shown,) by which the car-body is fastened to the car-truck. The lower casting or plate $b$ is provided with an annular groove or channel $b^4$, formed between the hub $b^5$ and an annular flange or lip $b^6$, and the top or upper bearing-surface (herein shown as a plate or casting $b^7$) is provided with an annular lip or flange $b^8$, which is adapted to extend into the annular groove $b^4$, the said annular lip being made in practice of such depth as not to come in contact with the bottom of the groove or channel $b^4$ when the upper and lower bearing plates or castings are fitted together in operative position. The lower plate or casting between the annular flange $b^6$ and its outer edge or circumference is preferably made inclined downward and provided with annular ridges or guides $b^9$ $b^{10}$ to form between them a circular track or pathway, on which are supported the anti-friction devices, (shown as rollers or balls $b^{12}$,) each provided with a substantially short arbor or hub $b^{13}$, projecting from the opposite ends of the roller. The rollers $b^{12}$, as herein shown, are tapering or conical in shape, and, resting upon the lower bearing-surface $b$, constitute the sole support for the upper bearing-surface $b^7$ and the parts secured to it.

The rollers or balls $b^{12}$ have co-operating with them a spacing-frame, herein shown as consisting of two circular rims or pieces $c$ $c'$, united at suitable intervals, as herein shown, by cross-pieces or tie-bars $c^2$. The circular rims or pieces $c$ $c'$ are provided on their inner sides, as herein shown, with substantially semicircular projections $c^3$, which preferably rest upon the arbors or hubs of the rollers and serve to separate the rollers from one another.

The spacing-frame is made of such height that the upper and lower edges of the said frame are out of contact with the upper and lower bearing-surfaces, and to protect the rollers from dust the outer rims $c$ $c'$ of the spacing-frame are extended below the guides $b^9$ $b^{10}$ of the upper and lower castings, the said guides constituting a track on which the rollers move.

In practice the upper plate and the weight supported by it rest entirely upon the body of the rollers, and the arbors or hubs of the same are substantially free from weight or pressure, the said arbors, as herein shown, supporting only the weight of the spacing-frame, which is substantially nothing.

The hub $b^5$ and annular rim or lip $b^6$ serve to take up or resist shocks caused by the starting and stopping of the car.

The car-truck bolster $a$ has secured to it at or near its opposite ends anti-friction supports or bearings for the sides of the car-body.

Each side anti-friction support or bearing consists of a lower bearing-surface, (shown as a plate or casting $d$,) provided, as shown, with ears or lugs $d'$, having bolt-holes by which the said plate or casting may be secured to the car-truck bolster $a$. The lower plate or casting $d$ is provided with ridges or guides $d^2$, which form between them a track, upon which one or more of the anti-friction devices (shown as rollers or balls $d^3$) are supported. The plate or casting $d$ between the guides $d^2$ is inclined, as herein shown, to conform to the conical shape of the rollers $d^3$, and the said lower plate or casting is provided with rack-teeth $d^4$, with which mesh gear-teeth $d^5$, preferably cut on the circumference of the roller $d^3$. The guides $d^2$ and rack-teeth $d^4$, as herein shown, are made in the arc of a circle the center of which is the transverse center of the car-truck bolster. The rollers $d^3$ are provided with arbors $d^{15}$, similar to the rollers $b^{12}$ of the center bearing, and the said arbors, as herein shown, support a spacing-frame composed of side pieces or rims $d^6$, joined by end pieces $d^7$, provided with slots or grooves $d^8$, into which enter the guides $d^2$. The rollers $d^3$ support the top or upper bearing-surface, (shown as a plate or casting $d^9$, similar to the lower plate or casting,) and the side pieces $d^6$ of the spacing-frame are located on the outside of the guides or ridges $d^2$, so as to form a dust-guard to prevent dust getting inside the frame. The upper and lower edges of the side pieces $d^6$ in practice are out of contact with the upper and lower castings, thereby obviating friction between the said parts. The sides $d^6$, as herein shown, are provided on their inner side with substantially semicircular projections $d^{10}$, which rest upon the arbors $d^5$.

I prefer to cast the gear-teeth $d^5$ integral with the roller, as shown in Fig. 9; but it is evident it may be cast separate therefrom and fitted upon the arbor inside the spacing-frame. By casting the gear-teeth integral with the roller the side bearing is rendered much simpler to construct. The upper part of the end pieces $d^7$ of the spacing-frame is also provided with slots or grooves $d^8$ to receive the guides $d^2$ on the upper plate or casting.

It will be noticed that in both the center-bearing and the side bearings the weight or pressure of the upper bearing-surface and the parts secured to it come directly upon the rollers, and that the only weight upon the arbors is that of the spacing-frame, which is substantially nothing as compared with the weight of a car-body; also, that the spacing-frame moves with the rollers and maintains the said rollers separated. Furthermore, it will be noticed that the ends of the rollers are separated from the sides of the spacing-frame in the side bearing and also in the center bearing by a considerable distance, so that all friction between the ends of the said rollers and the sides of the spacing-frame is obviated; also, that the bearing-surfaces are flat and the balls are free to roll or move on the said surfaces with unrestrained motion. By this construction the friction between the upper and lower bearing-surfaces is reduced to a minimum.

I have herein shown the side bearing as provided with three rollers; but I do not desire to limit my invention to any particular number of rollers, as one or more may be used, for the gist of my invention consists in making the two bearing-surfaces flat and parallel or substantially parallel, and provided with guides, and interposing between the said surfaces within the guides a roller or ball, which is free to move bodily between the said surfaces, the pressure or weight of the bearing-surfaces being exerted upon the body of the roller only and at diametrically-opposite points of said body.

The spacing-frame referred to, when two or more rollers are employed, serves the double purpose of a spacing-frame and a dust-guard, and in order that the dust may be more effectually excluded a strip or lining $f$, of felt or textile material, (see Fig. 11,) may be used between the spacing-frame and the upper and lower surfaces.

I claim—

1. In an anti-friction support or bearing, the combination, with two plane or flat bearing-surfaces provided with rack-teeth, of an anti-friction roller or ball having an arbor provided with a gear to engage said rack-teeth, and a spacing-frame supported by said arbor, substantially as described.

2. In an anti-friction support or bearing, the combination, with two flat or plain bearing-surfaces, of an anti-friction conically-shaped roller interposed between said surfaces and provided with arbors extended beyond its ends, and an independent frame movable with the said roller, substantially as described.

3. In an anti-friction bearing or support, the combination, with two plane or flat concentric bearing-surfaces, of anti-friction conically-shaped rollers provided with arbors, and having their peripheries inclined toward the center of the concentric bearing-surfaces, and an independent frame movable with the said anti-friction rollers, and having its sides out of contact with the ends of the said anti-friction rollers, substantially as described.

4. In an anti-friction center bearing or support, the combination, with a bearing-surface $b$, provided with a hub having a hole $b^3$ and with an annular rim $b^6$, forming with the said hub a groove or channel $b^4$, a co-operating surface $b^7$, provided with a lip or flange $b^8$ to enter the said groove or channel, of anti-friction devices interposed between the said bearing-surfaces outside of the rim $b^6$ and provided with arbors, and a spacing-frame co-operating with said arbors to maintain the anti-friction devices separated, substantially as described.

5. In an anti-friction center bearing or support, the combination, with a bearing-surface $b$, provided with a hub having a hole $b^3$ and with an annular rim $b^6$, forming with the said hub a groove or channel $b^4$, guides $b^9$ $b^{10}$ on said bearing-surface, a co-operating bearing-surface $b^7$, provided with a lip or flange $b^8$ to enter the said groove or channel, of anti-friction devices interposed between the said bearing-surfaces outside of the rim $b^6$ and provided with arbors, and a spacing-frame co-operating with said arbors to maintain said anti-friction devices separated, and having side pieces extended outside of and below the guides $b^9$ $b^{10}$, substantially as and for the purpose specified.

6. In an anti-friction side bearing or support, the combination, with a bearing-surface provided with rack-teeth and a co-operating bearing-surface provided with rack-teeth, of an anti-friction conically-shaped roller provided with arbors and having gear-teeth to engage said rack-teeth, and a spacing-frame movable with the said arbors, substantially as described.

7. In an anti-friction side bearing or support, the combination, with a bearing-surface provided with rack-teeth and a co-operating bearing-surface provided with rack-teeth, of an anti-friction device provided with arbors and having gear-teeth to engage said rack-teeth, and a spacing-frame having side pieces located outside of the said gears and movable with the said arbors, substantially as described.

8. In an anti-friction side bearing or support, the combination, with a bearing-surface provided with rack-teeth and having a guide and a co-operating bearing-surface provided with rack-teeth, of an anti-friction conically-shaped roller provided with arbors and having gear-teeth to engage said rack-teeth, and a spacing-frame having side pieces located outside of the said gears and movable with the said arbors, substantially as described.

In testimony whereof I have signed my name to this specification in the presence of two subscribing witnesses.

LUTHER K. JEWETT.

Witnesses:
JAS. H. CHURCHILL,
EMMA J. BENNETT.